United States Patent [19]

Collins

[11] Patent Number: 5,214,957
[45] Date of Patent: Jun. 1, 1993

[54] INTEGRITY AND LEAK RATE TESTING OF A HERMETIC BUILDING

[75] Inventor: Normand Collins, Trois-Rivières-Ouest, Canada

[73] Assignee: Hydro-Quebec, Montreal, Canada

[21] Appl. No.: 861,278

[22] Filed: Mar. 31, 1992

[51] Int. Cl.⁵ ............................................. G01M 3/26
[52] U.S. Cl. ....................................................... 73/40
[58] Field of Search ........................................... 73/40

[56] References Cited

U.S. PATENT DOCUMENTS

| | | | |
|---|---|---|---|
| 3,357,257 | 12/1967 | Herndon et al. | 73/40 X |
| 4,420,969 | 12/1983 | Saum | 73/40 |
| 4,510,791 | 4/1985 | Yuill | 73/40 |

FOREIGN PATENT DOCUMENTS

| | | | |
|---|---|---|---|
| 62597 | 4/1983 | Japan | 73/40 |
| 269096 | 11/1988 | Japan | 73/40 |
| 12034 | 1/1990 | Japan | 73/40 |
| 1065709 | 1/1984 | U.S.S.R. | 73/40 |

Primary Examiner—Hezron E. Williams
Assistant Examiner—Joseph W. Roskos
Attorney, Agent, or Firm—Foley & Lardner

[57] ABSTRACT

Device and method to achieve a low pressure pressurisation test in order to evaluate the integrity and the leak rate of a hermetic building. After the pressurisation to about a few kilopascals of the building and of a reference volume within said building, the reference volume is isolated and the evolution of the differential pressure as a function of time between the two is measured with a differential manometer. The tubes of the reference volume can be made of copper tubes welded together and the reference volume divided in sections wherein the volume of each section is a scale representation of the volume of a corresponding building zone. The use of a reference volume within the building allows temperature variations to be compensated. The device and the method further comprise the use of a sampling network circuit which is used to collect samples of air throughout the building and allow the partial pressure variation of some gases to be compensated for. This device and method are very suitable for the building of a nuclear power plant.

21 Claims, 10 Drawing Sheets

| | LEAK RATE A 3KPa (g) (% vol/day) | DIAMETER OF EQUIVALENT HOLE (mm) |
|---|---|---|
| KNOWN LEAKS | 0,114 | 3,50 |
| UNKNOWN LEAKS + ARTIFICIAL LEAK | 0,162 | - |
| ARTIFICAL LEAK | 0,0483 | - |
| ARTIFICIAL LEAK MEASURED WITH THE FLOWMETER | 0,0501 | 2,3 |

INTEGRITY AND LEAK RATE TESTING OF A HERMETIC BUILDING

FIELD OF THE INVENTION

The present invention relates to a method and a device to achieve a pressurisation testing of an air-tight sealed or hermetic building with temperature compensation. The method and device are used to quantify air leaks that occurs under various conditions. Those leaks may be the result of, in particular, cracks in the walls, holes accidentally left open in the walls or the porousness of the building materials. The pressurisation testing is used to evaluate the integrity of the building and to evaluate the leak rate of the building at maximum pressure.

The evaluation of the integrity of the building, hereinafter called "integrity test", is used to verify if the building, once hermetically closed, does not have holes which, when combined, would have a diameter over a maximum allowable value. This test refers to a normal operation situation and, therefore, is carried out in conditions similar to those found in normal operation situation.

The evaluation of the leak rate, hereinafter called "leak test", is used to verify if the leak rate at maximum pressure, with reference to the outside of the building, is not above a maximum level as specified in standards. The leak rate is expressed in terms of loss of volume per day at the same pressure. The maximum pressure is the highest pressure that may occur in the eventuality of the break of a major pipe or any other event that may greatly rise the internal pressure of the building. A safety margin is also added to the highest pressure to calculate the maximum pressure.

DESCRIPTION OF PRIOR ART

Leak testing is currently used in many nuclear power plant buildings, but has the drawback of requiring the stopping of the reactor and thus the normal activity of the plant. This leads to a loss of productivity and loss of revenues. Moreover, it is possible that the high pressure used in conventional pressurisation tests generate stresses on the building, and deformations or cracks may appear. Those tests also require a large preparation and must take into account the atmospheric pressure variations as well as the effect of the partial pressure of water vapour in the building and the effect of internal temperature variations of the building to be able to calculate the pressure drop due to leaks. This usually requires the use of numerous instruments to determine the temperature and the humidity of the building. As for the atmospheric pressure, it is not a very reliable reference because it is subject to fluctuation.

SUMMARY OF THE INVENTION

The present invention provides an integrity test and a leak test at a low pressure and with the use of a hermetic reference volume designed so that temperature changes inside the building do not influence testing. The advantages of this invention are:

to allow to proceed with the integrity and the leak tests while equipment in the building, such as a nuclear reactor, is working, thus eliminating the costs of stopping production;

to reduce the stresses on the building, thus reducing the possibility of generating permanent deformations;

to eliminate the error caused by the atmospheric pressure, which is no longer taken as the reference;

to eliminate the collection and the processing of a large quantity of temperature data and the errors relating to them;

to calculate the leak rate at high pressure by extrapolating the results, thus eliminating the need to carry out a high pressure test.

The originality of this method with temperature compensation is the use of the reference volume designed to represent as best as possible the behavior of the temperature of each of the building zones. This method makes the differential pressure between the reference volume and the interior of the building almost independent of the internal temperature variations. Indeed, it is possible to show that assuming the air is a perfect gas, when a confined mass of air in a leak tight reference volume is itself contained in a second fixed volume of air, the differential pressure between the two volumes is independent of the temperature.

The object of the present invention is to provide a device to achieve the pressurisation test of a hermetic building comprising:

(a) means to pressurize interior air of the building to a pressurisation pressure, the air of the interior of the building having a total pressure;

(b) an air-tight tubular network, enclosing a mass of air having a total pressure and hereinafter called "reference volume", consisting of a plurality of interconnected tubes made of a material having a good thermal conductivity, the tubular network being set inside the building and divided into sections, each section being set inside a building zone and having a given fraction of the volume of the zone in which it is located in order to reproduce the effect of the temperature variations of the zone on the total pressure in the building;

(c) means to equalize the total pressure of the reference volume with the total pressure of the interior of the building;

(d) means to measure over time the differential pressure between the reference volume and the interior of the building;

(e) an air sampling network circuit set inside the building zones and sampling air of the zones proportionally to their volume with reference to the volume of the building, the sampled air consisting of a plurality of gases, each having a partial pressure;

(f) means to measure the partial pressure of some of the gases within the sampled air in order to be able to calculate the effect of partial pressure variations of these gases on the total pressure of the interior of the building; and (g) means to calculate real differential pressure variations due only to leaks of the building.

According to a preferred embodiment, the device may comprise the following supplementary elements:

(h) means to evaluate building integrity by calculating a diameter of a hole equivalent to the real differential pressure variations;

(i) means to calculate a leak rate at the pressurisation pressure; and (j) means to extrapolate the leak rate calculated with the element (i), in order to evaluate the leak rate if a higher pressurisation pressure might have been used.

According to another object of the invention, there is provided a method of carrying out a pressurisation test of a hermetic building, comprising the step of:

(a) installing an air-tight tubular network in the building, enclosing a mass of air having a total pressure and hereinafter called "reference volume", consisting of a plurality of interconnected tubes made of a material having a good thermal conductivity, the tubular network being set inside the building and divided in sections, each section being set inside a building zone and having a given fraction of the volume of the zone in which it is located in order to reproduce the effect of temperature variations of the zone on the total pressure in the building;

(b) installing, inside the building, an air sampling network circuit set inside the building zones and sampling air of the zones proportionally to their volume with reference to the volume of the building;

(c) pressurizing the interior of the building with air until it reaches a desired pressurisation pressure;

(d) equalizing the total pressure of the reference volume with the total pressure of the interior of the building;

(e) measuring over time differential pressure variations between the interior of the building and the reference volume;

(f) measuring partial pressure of some of the gases within the sampled air in order to be able to calculate the effect of the partial pressure variations of these gases on the total pressure of the interior of the building; and (g) calculating the real differential pressure variations due only to leaks of the building.

According to a preferred embodiment, the method may comprise the following supplementary steps:

(h) evaluating a building integrity by calculating a diameter of a hole equivalent to real differential pressure variations;

(i) calculating a leak rate at the pressurisation pressure; and (j) extrapolating the leak rate calculated in step (i) in order to evaluate the leak rate if a higher pressurisation pressure had been used.

Preferably, water vapour is one of the gases whose partial pressure is to be monitored. The partial pressure of water vapour may be measured with a hygrometer calculating the dew point of the sampled air.

The tubes of the tubular network are preferably welded together in order to reach a very great air-tightness. Also, the tubes may be made of copper.

Preferably, the tubular network has a means to verify its air-tightness.

The differential pressure between the exterior and the interior of the building is measured with an auxiliary differential manometer in order to apply a correction factor to correct the leak rate.

The means to measure the differential pressure between the reference volume and the interior of the building preferably consist of a differential manometer.

The device and the method may further comprise an artificial leak, wherein the air flow is measured by a flowmeter, in order to verify the validity of the calculated differential pressure variations.

The above-mentioned method and device may advantageously be used on a nuclear reactor building wherein the nuclear reactor is working at maximum capacity.

A non restrictive description of a preferred embodiment will now be given with reference to the appended drawings.

BRIEF DESCRIPTION OF THE DRAWINGS

FIG. 7b is a graph of the first derivative of the graph of FIG. 7a; and

FIG. 7c is a graph of the second derivative of the graph of FIG. 7a.

DESCRIPTION OF A PREFERRED EMBODIMENT

Figure 1:
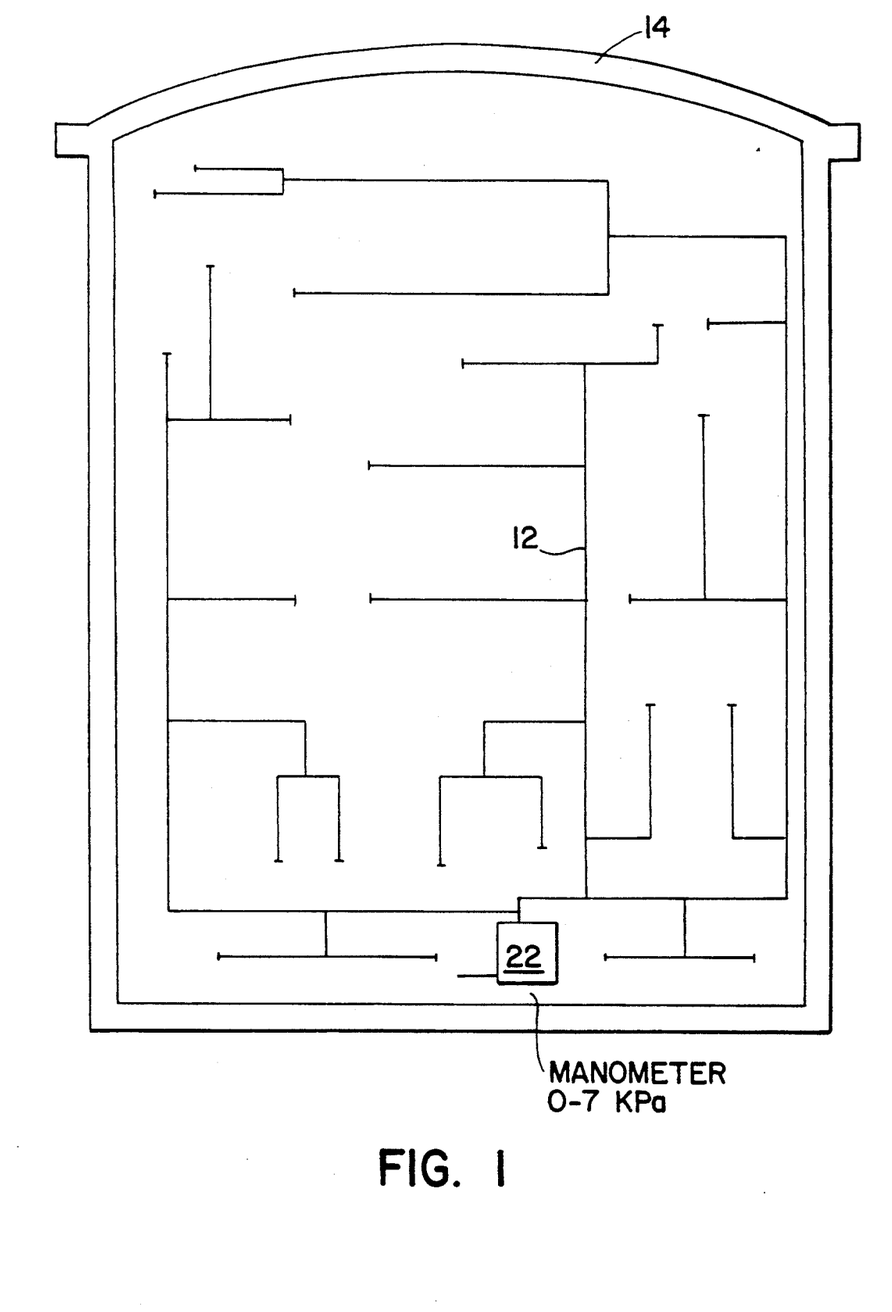
FIG. 1 is a cross-sectional elevational view of the building showing the general aspect of the tubular network.

The device, according to the invention, comprises a reference volume 10 located inside a plurality of tubes welded together and communicating with each other. The tubes form an air-tight tubular network 12 which is divided in a plurality of sections. Each section is located in a zone of the building 14 and represents a given fraction of the volume of its corresponding zone. Different sizes of tubes may be used to ease the scaling of the sections.

The scaling of the sections allows the reference volume 10 to simulate the effect of temperature changes of the air of each zone on the total pressure of the interior of the building 14. Since the air expansion is a function of temperature, temperature variations have to be taken into account and properly compensated for because they have a direct effect on the total pressure in the building 14. The scaled reference volume 10 allows a temperature fluctuation occurring in a zone to have a proportional effect on the total pressure in the reference volume 10. A temperature variation in a smaller zone may have a smaller effect than a smaller temperature variation in a larger zone.

All the connectors between the tubes of the tubular network 12, except the connector associated with the instruments, are welded in order to obtain a very good air-tightness.

The use of a tube material that has a good thermal conductivity allows a reduction of the delay between a temperature variation of the air of a building zone and the corresponding temperature variation of the reference volume 10. Copper is, for example, a tube material that may be used.

When sections of the tubular network 12 are fixed to the walls of the building 14, the supports between the walls and the tubes are preferably thermally insulated. If not, the reference volume 10 may be at a different temperature than the air of the building 14 since the walls are generally at a different temperature because of, for example, the sun or a cooler temperature outside.

Before beginning the test, all equipment which involves an air exchange with the outside of the building 4, such as air conditioning, ventilation or airlocks, is closed. Some air is then brought into the building 14 to pressurize it. The pressurisation pressure is preferably between 3 and 15 kPa, enough to create a small differential pressure with the outside that may produce significant leaks over some hours. Higher pressures are also possible, but a pressure such as 3 kPa has the advantage that it does not create stresses on the building 14 and does not affect the safety of an operating nuclear reactor, if the invention is used to test the building of a nuclear power plant.

Figure 3:
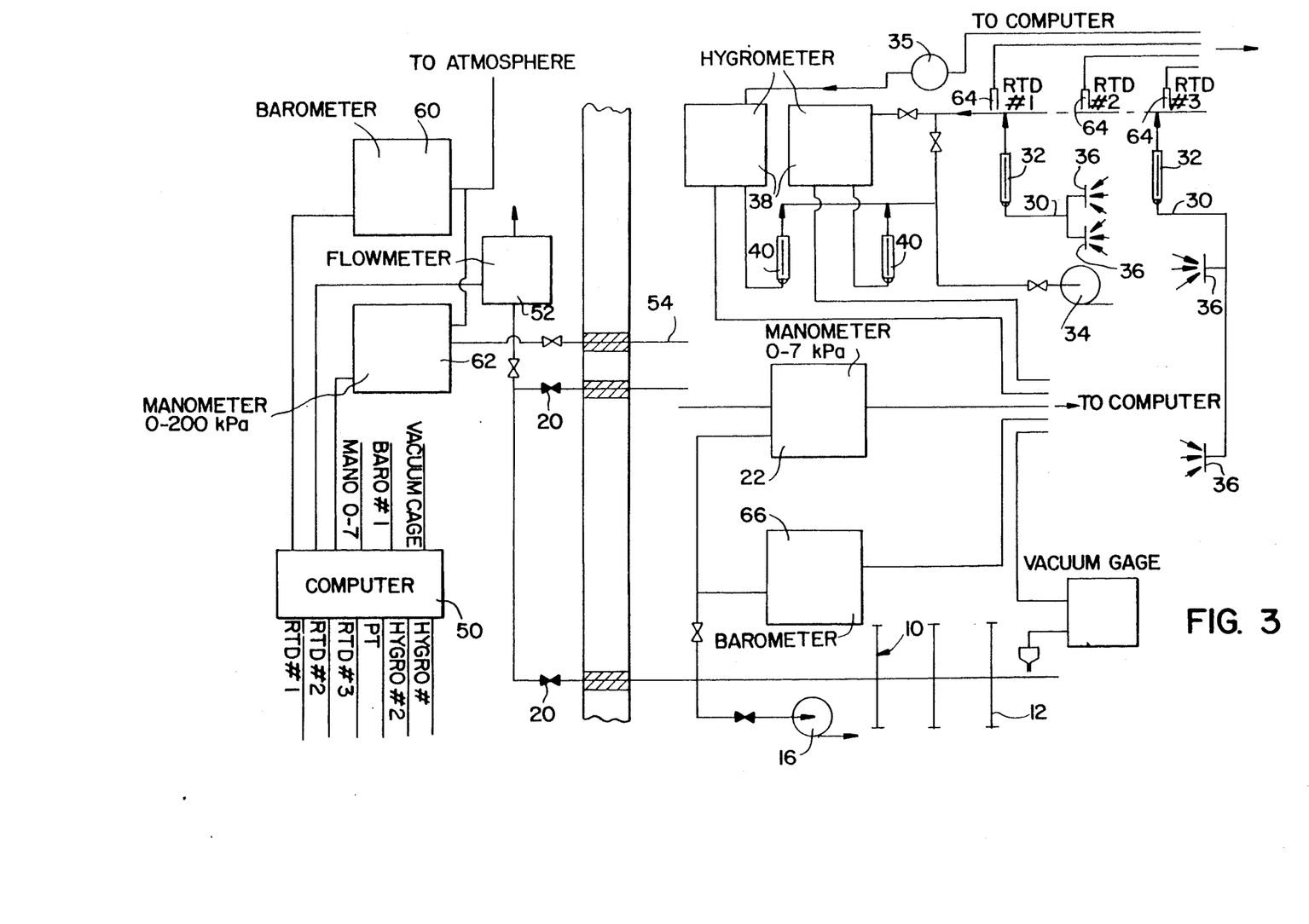
FIG. 3 is a schematic view showing the invention.

When the desired pressure is reached, the pressure of the reference volume 10 is equalized with the pressure of the building 14 using valves 20 that allow the air to flow between the building 14 to the reference volume 10. The equilibrium of the two pressures sets the manometer to zero. Afterwards, the valves 20 are closed, generally for the remainder of the test.

Preferably, the humidity of the air entering the tubular network 12 is kept low, as otherwise the water can condense an create a drop of pressure inside the tubular network 12.

Figure 2:
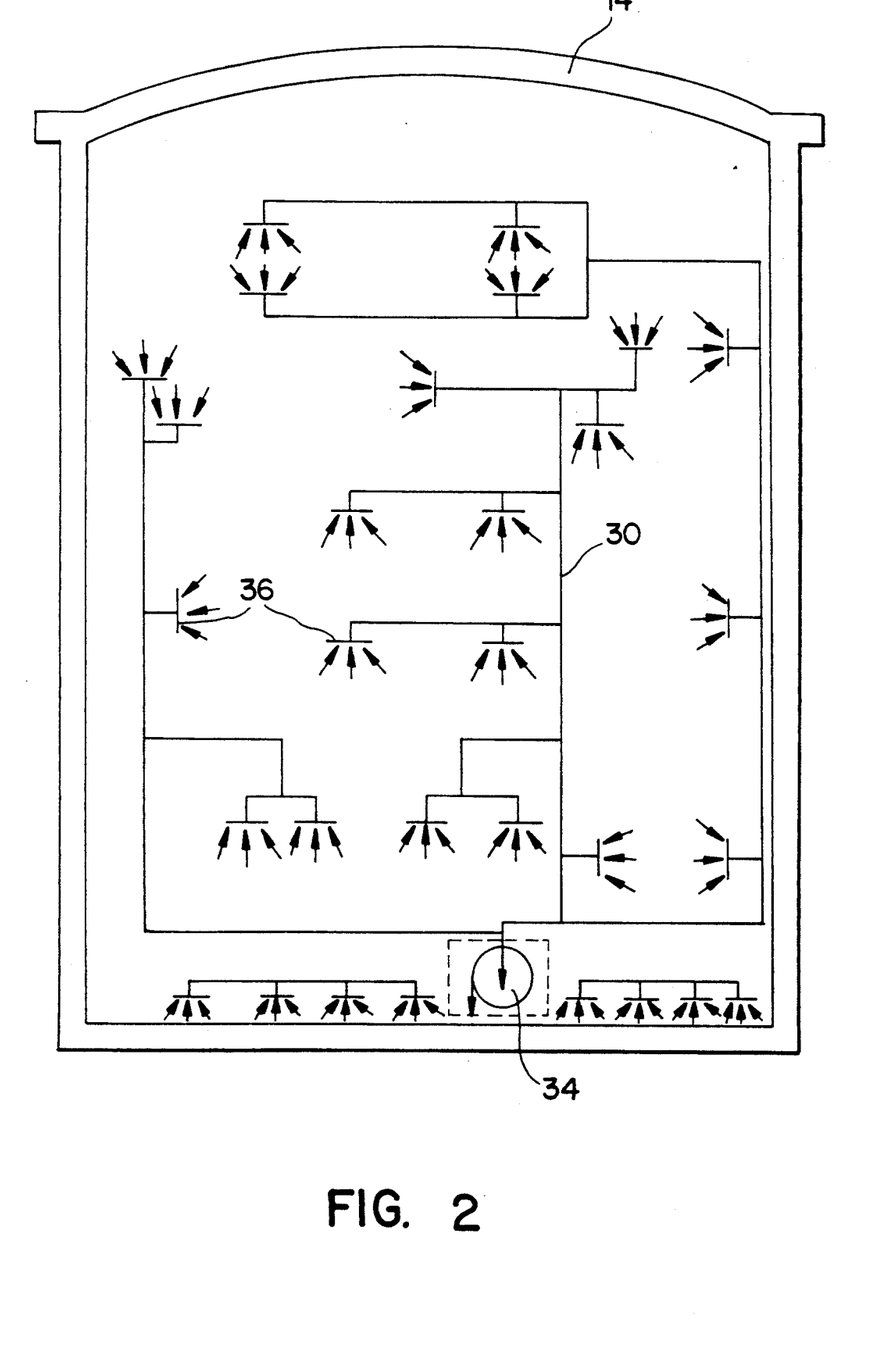
FIG. 2 is a cross-sectional elevational view of an embodiment of the sampling network circuit.

Since the total pressure inside the building 14 is the sum of all the partial pressures of each gas within the air, any variation in the partial pressure of a gas has to be taken into account because it varies the total pressure of the building 14. One of the most common gases that is to monitored is water vapour. The use of the sampling network circuit 30 allows to get some samples from all of the zones in order to verify if the partial pressure of some gases has changed and if so, to compensate for the changes in the results of the differential pressure. Some flow regulators 32 set at different locations allow the volume of air taken in a zone to be sampled proportionally to volume of the corresponding zone. The greater the volume of a zone, the greater the volume of air sampled therein is.

FIG. 2 shows a way to set the sampling network circuit 30 inside the building 14. The air is pumped at a constant rate by the pump 34 and then brought to the partial pressure monitoring instruments. The air inlets 36 allows the air to enter the sampling network circuit 30. The size of the tubes of the sampling network circuit 30, which are advantageously made of copper, are a function of the air flow. The air is returned to the building 14 after it goes to the instruments.

Generally, the water vapour is the only gas whose partial pressure is to be monitored because it is always found in air, unless the air has been treated, and because changes in its partial pressure affect significantly the total pressure of the building 14. Instruments such as the two dew point hygrometers 38 may be used to monitor the partial pressure of the water vapour. More than one hygrometer 38 used simultaneously allow a greater accuracy. Moreover, the pressure inside the sampling network circuit 30 is measured with the manometer 35 in order to be able to correct the vacuum created by the pump 34. This vacuum is about 10 kPa typically.

In a nuclear power plant, some other gases such as helium, carbon dioxide and nitrogen may have to be monitored, particularly when the nuclear reactor is operating because many devices use those gases and leaks may occur. It is not essential to monitor those gases with the sampling network circuit 30 and its instruments because the leaks are generally very small. Therefore, a checking of the gas levels in the devices is used to check the quantities of leaked gases to calculate, if appropriate, correction factors to correct the differential pressure results.

An artificial leak may also be created in order to verify the validity of the test. This leak is useful to know if the evolution of the differential pressure is right by comparing the flow rate of the artificial leak as calculated with the flowmeter 52, with the flow rate calculated with the test. The artificial leak is achieved by the use of the tube 54 linking the interior of the building 14 with the exterior. The differential pressure between the tubular network 12 and the building 14 is brought to zero before the test with the artificial leak to ease the calculations.

Since the leak rate test measures the quantity of air leaking through the small cracks and to the exterior, the differential pressure between the interior and the exterior of the building 14 is preferably measured with the manometer 62 because a pressure variation outside the building 14 changes the leak rate. This achieves a normalization of the leak rate and therefore improves the precision of the results. Moreover, the barometer 60 is used to measure the atmospheric pressure which allows, along with the differential pressure, to calculate the total pressure of the building 14. This total pressure is useful in some calculations and in the pressurisation process.

To obtain even more precise results, other instruments can be added. For example, the barometer 66 may be used to know the total pressure of the reference volume 10 which can be used to know the mean building temperature because the tubular network 12 functions as a gas thermometer. Some temperature probes RTD 64 placed at different locations on the sampling network circuit 30 give the exact mean temperature of the building 14 and the temperature changes can be compared with the ones detected by the reference volume 10. The delay between the two gives the time of response of the reference volume 10, which can then be compensated by an appropriate correction calculation.

During the test, the differential pressure measurements as a function of time are taken at regular intervals which are short enough to allow a good following of the evolution of the differential pressure.

In order to speed up the calculations, the instruments such as the manometers, the hygrometers, etc., are connected to a computer 50. The connections between the instruments and the computer 50 comprise transmission modules which convert the analog display into a digital form. Proper software is useful to help the data acquisition and storage as well as the calculations.

Figure 4A:
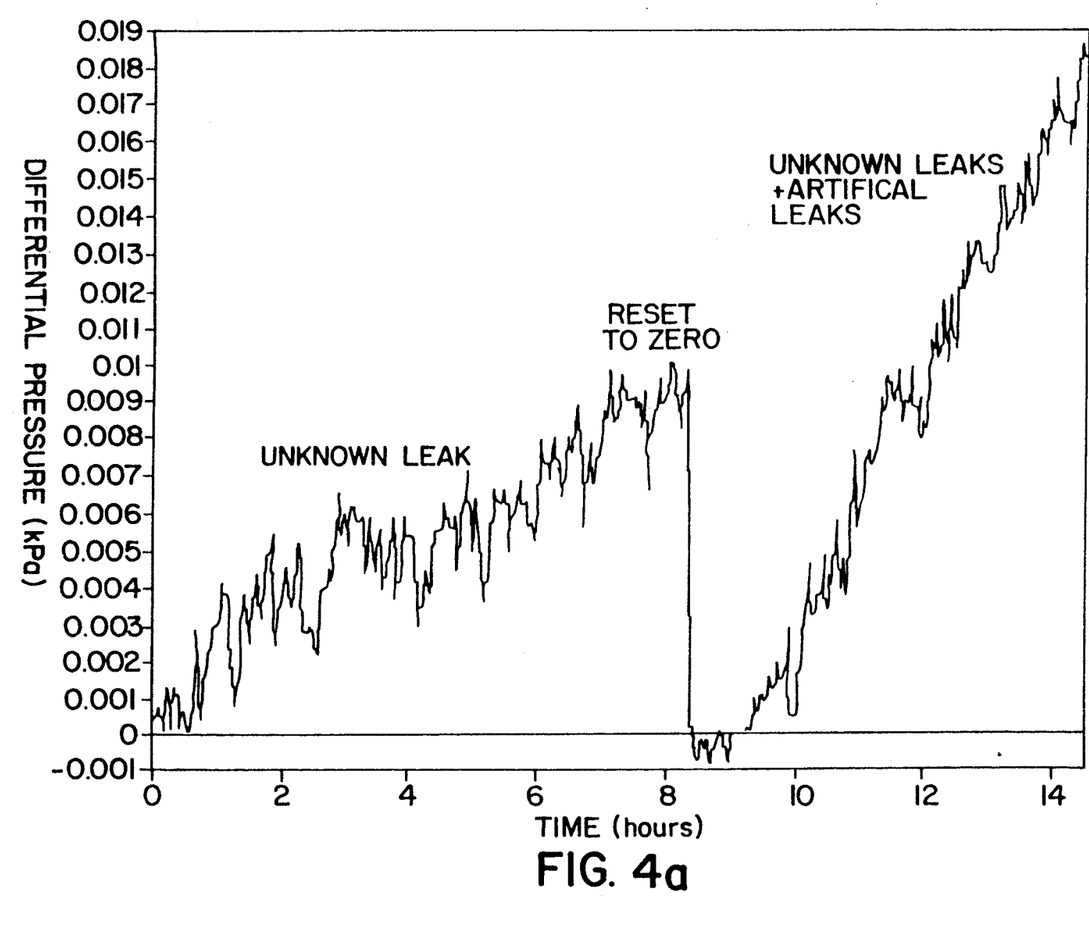
FIG. 4a is a graph of the differential pressure in function of time, as obtained during a test performed at Gentilly II.

When the test is over, the curve of the differential pressure as a function of time is plotted in order to verify the pressure changes. FIG. 4a shows an example of a curve as obtained after a test. As it can be noticed, the mean differential pressure variation is regular in spite of small sharp changes. It is also possible to see the reset of the differential pressure at the 8th hour, which is when the artificial pressure leak was started. The artificial leak is added to the building's leaks and that is because the differential pressure loss rate had accelerated.

Figure 4B:
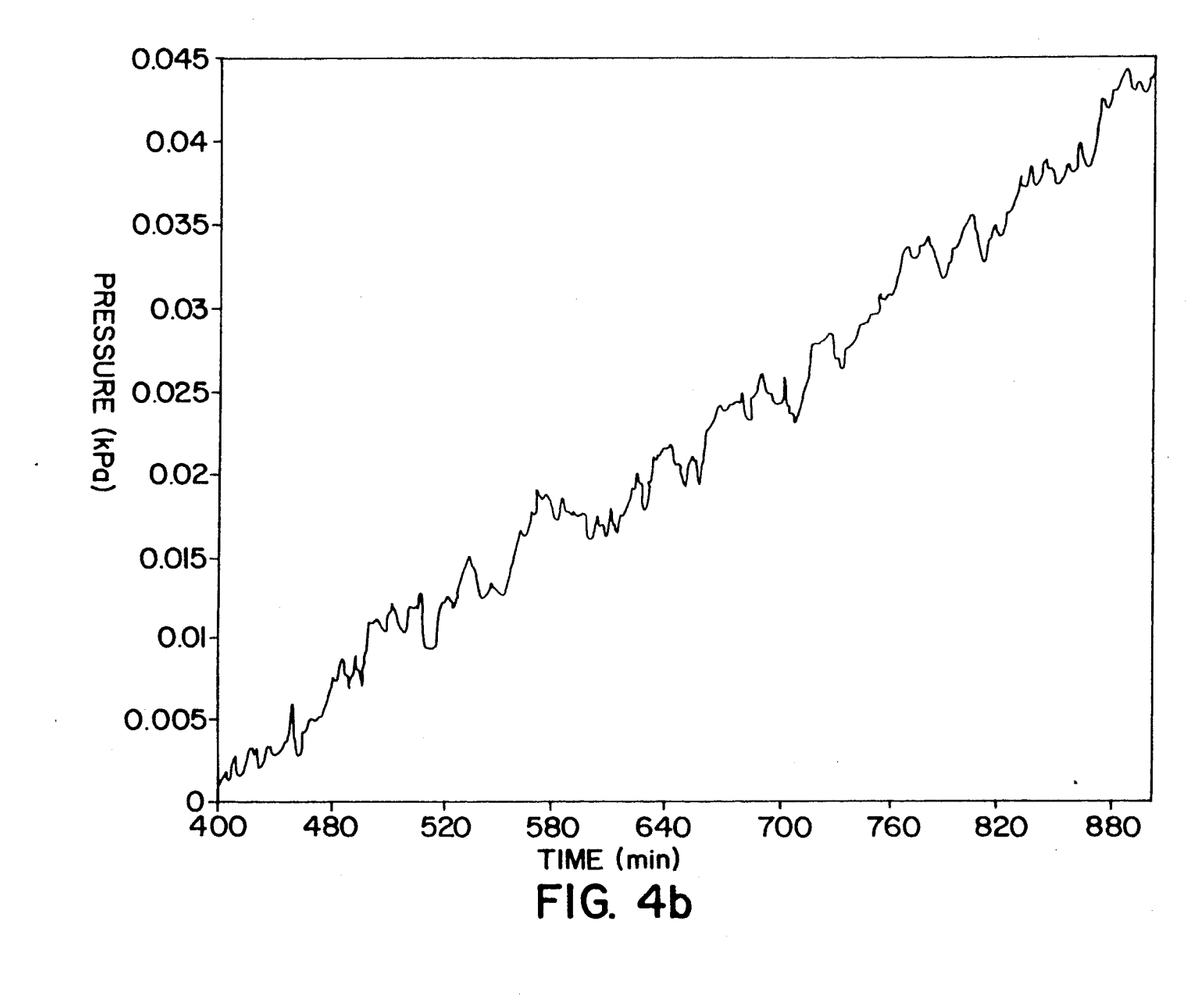
FIG. 4b is a graph of the pressure leak of the building as a function of time as obtained by using a part of FIG. 4a, corrected in function of different parameters.

The results of the differential pressure are then normalized, particularly as a function of the partial pressure of the water vapour and the exterior pressure. FIG. 4b shows a graph of the pressure drop as a function of time, due to the leaks of the building 14 for the test of FIG. 4a.

Figure 5:
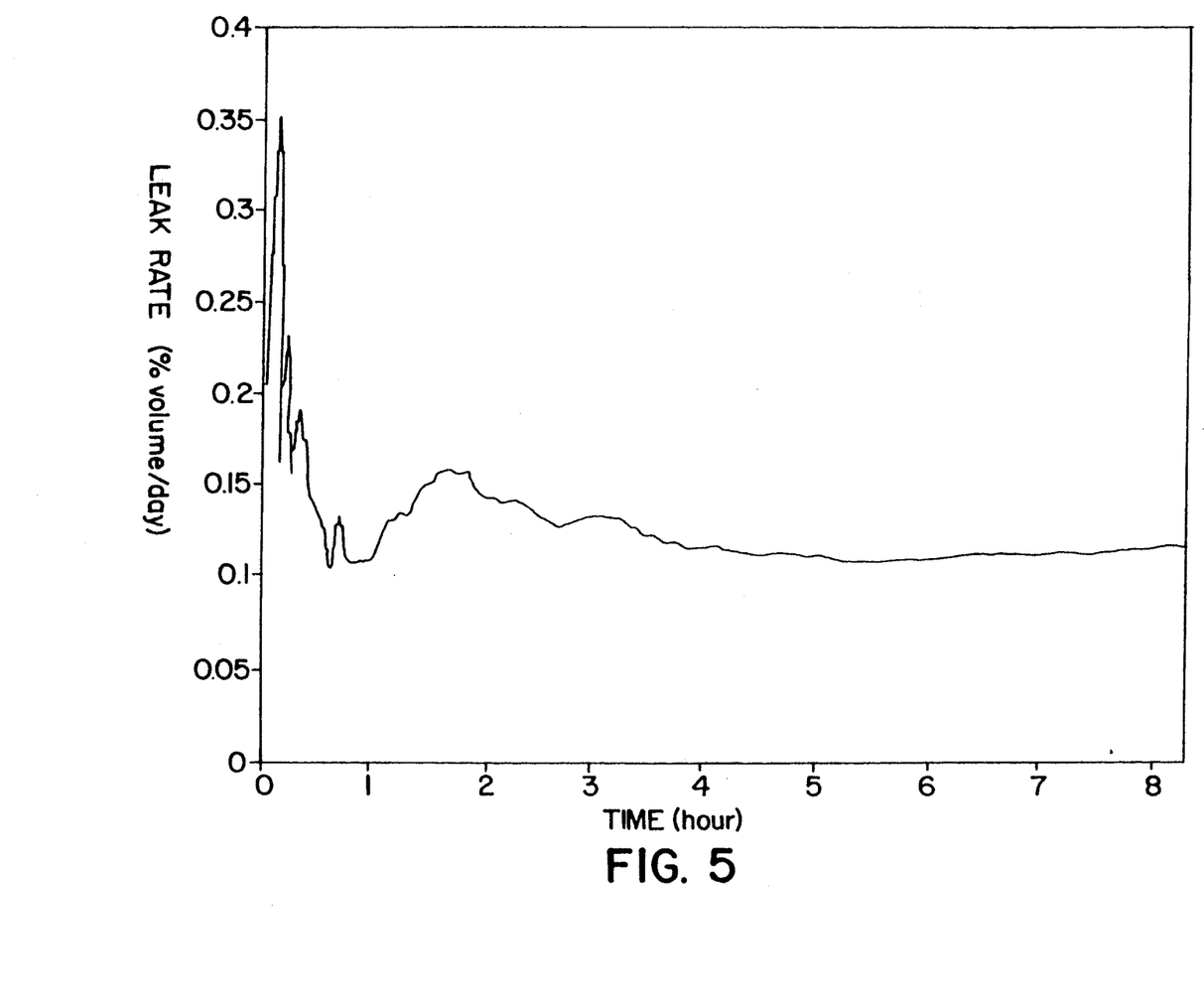
FIG. 5 is a graph of the leak rate as a function of time, calculated with the corrected results of FIG. 4b.

With the above-mentioned results, it is possible to obtain the graph of FIG. 5 in which the leak rate has been calculated as a function of time for the first eight hours of the test. The leak rate is calculated in terms of loss of volume per day at the pressure of the test. In this example, the leak rate is cumulative in time and therefore each point on the curve is using the preceding points in its calculation, so the latest results on that curve are more significant of the preceding ones because the greater quantity of data allows a better compensation of non significant results. The leak rate is the most significant point on the curve, thus the point at the right end of the curve.

The leak rate of the artificial leak is calculated, for the purpose of checking the validity of the results, by subtracting the leak rate of the leaks to the leak rate of the test made after the 8th hour in the example. This leak rate is then compared with the leak rate obtained with the results of the flowmeter 52.

Figure 6:
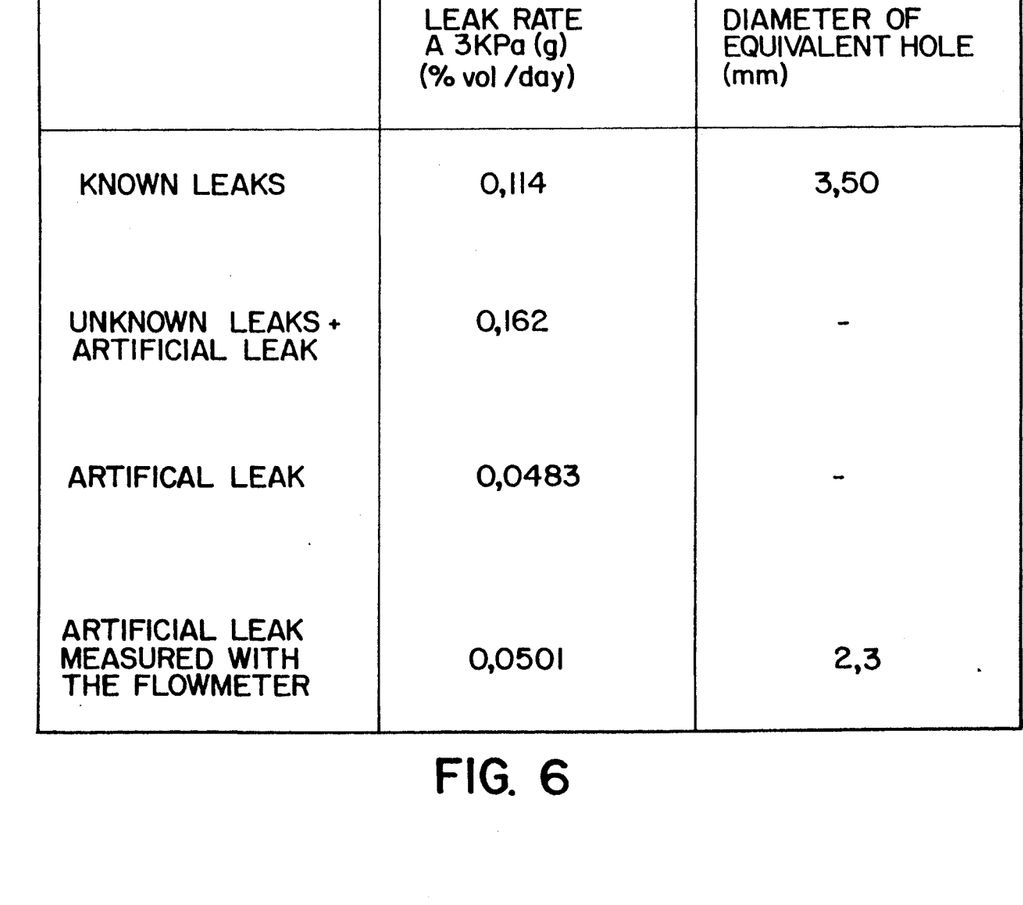
FIG. 6 is a table of the results of the test shown in FIGS. 4a, 4b and 5.

It is possible to calculate the diameter of the hole equivalent to all the leaks. The table of FIG. 6 present the results of the leak rate and the diameter of the equivalent hole for the example of FIG. 4a.

The computer 50 calculates all the parameters without having to plot the above-mentioned graphs. It also allows to greatly simplify the data acquisition and it allows a greater precision in the calculations.

Among the results that are useful to calculate, there is the leak rate at high pressure, particularly the maximum pressure that may occur inside the building 14. However, a simple extrapolation of the results is not possible because of the complexity of the flow through the leaks. It is therefore essential to know if the flow is laminar or a turbulent, or even a combination of the two. When this is known, the extrapolated leak rate gives a good indication of the condition of the building 14 without having to do a high pressurisation test.

One of the applications of the above-mentioned method and device is their use for a nuclear power plant building. The use of a low test pressure allows to carry on the test without stopping the reactor, which can even function at maximum power.

The method and the device can be used along with the conventional high pressurisation tests.

EXAMPLE

A device as described hereinabove has been tested at the building of the Gentilly II nuclear power plant in Quebec. However, the reactor was non operative during the test. The tubular network of this building consisted of 754 meters of copper tubes ASTM B-68 of a diameter between 4.8 and 12.7 mm. The volume of the network was 24 300 ml and simulated the volume of the building with a scale of 1:2,000,000. The building was divided into 11 zones. A differential manometer with a small scale was used to measure the pressure difference between the tubular network and the interior of the building.

A barometer was used to measure the atmospheric pressure and was located outside the building.

The sampling network circuit consisted of 730 meters of copper tubes ASTM B-68 having a diameter between 9,5 and 19,0 mm. The air entered the sampling network circuit by means of 32 air-inlets. A pump was used to create a depression and force the air to go to the instruments.

In this building, only the partial pressure of the water vapour was monitored with the sampling network circuit. The means to measure its partial pressure were two cooled mirror dew point hygrometers. Two regulation valves were used to maintain a flow suitable for the good operation of the hygrometers.

Eleven regulation valves were used to check that every one of the eleven building zones of the interior of the building were sampled in proportion to their volume with reference of the volume of the building. A manometer was used to measure the vacuum created by the pump into the sampling network circuit for correcting the results of the partial pressure.

The computer used was an IBM PC 386 20 MHz with a mathematic co-processor and a 40 Mb hard disk. The computer also used a VGA graphic card with a color monitor and a printer. The data were transmitted from the instruments to the computer by Metrabyte TM M1100 modules. The computer was set outside the building.

The software STRATRAD PBR TM was used for data acquisition and calculation. This software has been designed especially for this test.

The air-tightness of the tubular network was verified before beginning the test. First, a vacuum was created inside the tubular network with a vacuum pump. The vacuum is preferably used instead of the pressurisation because temperature variations do not have a significant effect on the small remaining quantity of air. When the vacuum is completed, the vacuum pump is isolated from the tubular network.

Figure 7A:
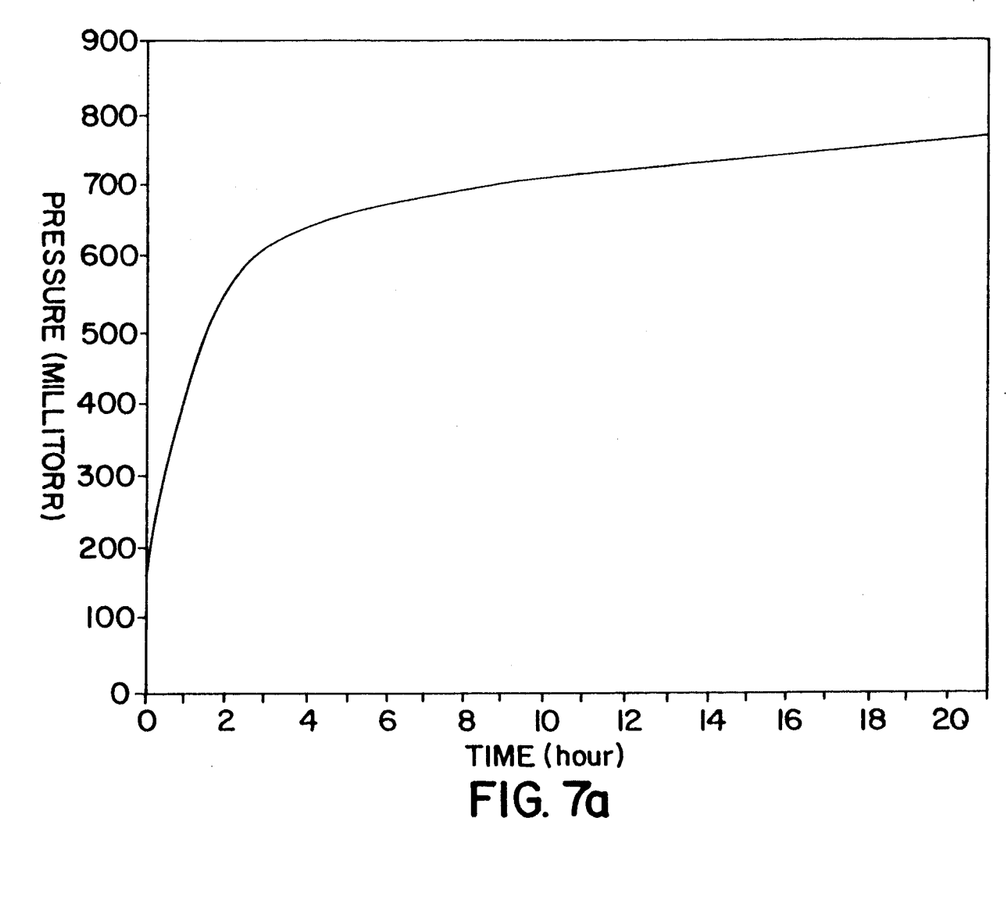
FIG. 7a is a graph of the pressure variation inside the tubular network as a function of time, as obtained in the air-tightness test of the tubular network performed at Gentilly II nuclear power plant.
Figure 7B:
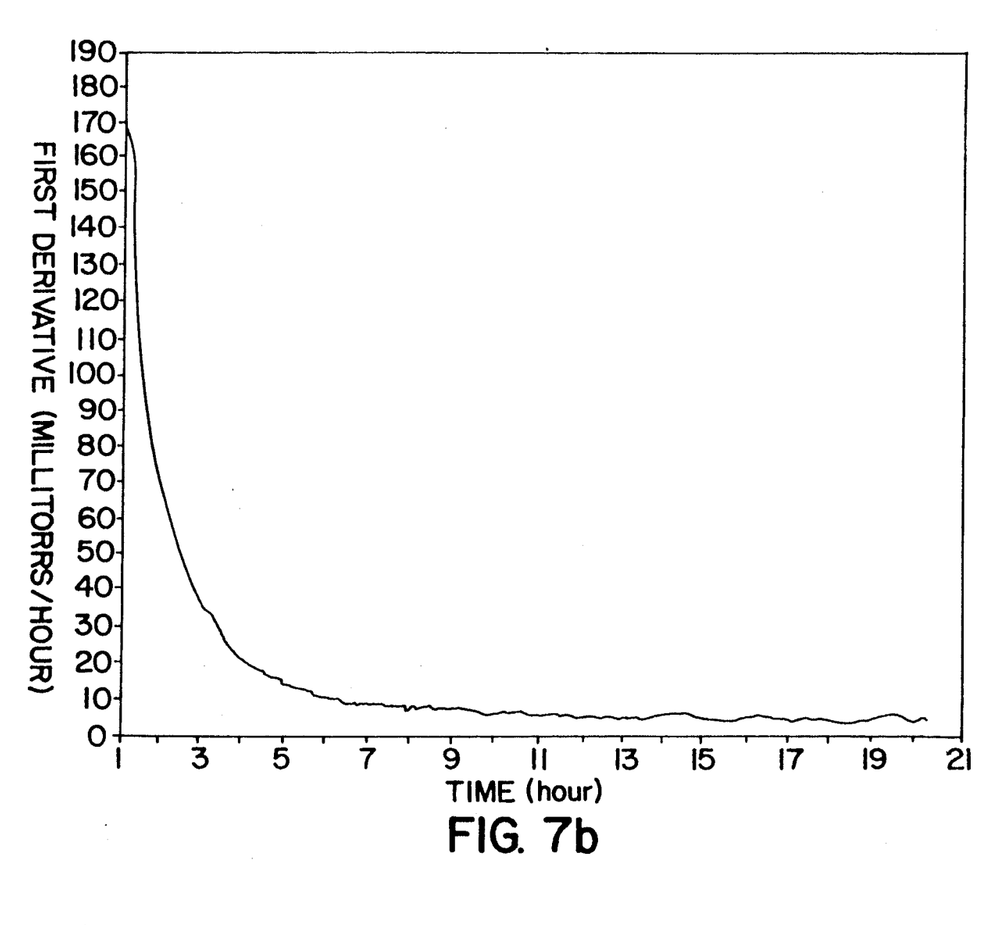
Figure 7C:
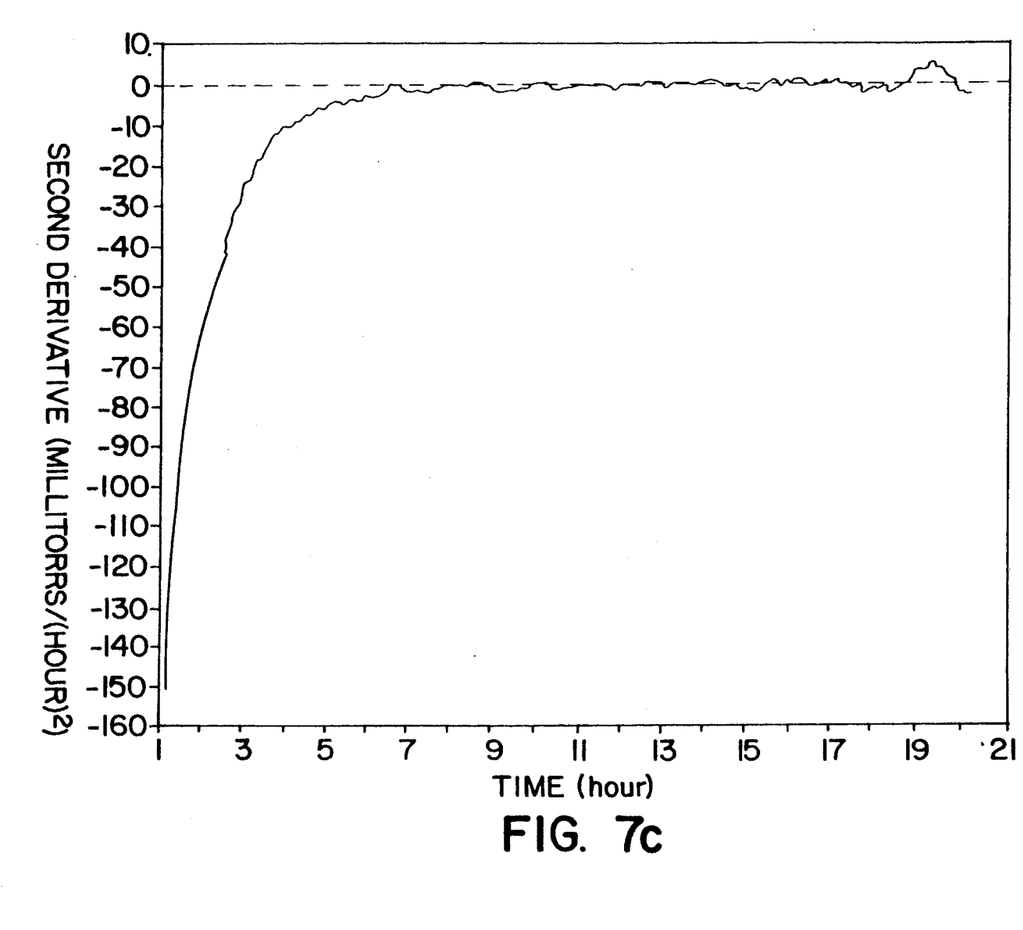

The pressure inside the tubular network is measured with a vacuum gauge and the results are stored as a function of time. As shown in the graph of FIG. 7a, the pressure tends to rise sharply in the few hours after the vacuum was completed. This is due to the slow equilibrium of the pressure between the sections of the tubular network. Only the straight part of the curve, in that case after the equilibrium, will be used for the calculations. To check when the equilibrium ends, the curve of FIG. 7a is derived. The curve as obtained, shown on FIG. 7b, shows that the pressure variations slow progressively and stabilize around the 8th hour. FIG. 7c shows the second derivative of the curve of FIG. 7a and it appear clearly that the pressure variation is stable after the 8th hour. Therefore, the calculations are made with the results after the 8th hour. The slope of the curve of FIG. 7a after the 8th hour gives the value of the air-tightness. In that case, the pressure variation is 5.335 millitorrs per hour. If that value is outside the desired window, the tubular network has to be fixed It was not the case then.

When this air-tightness test was over, the pressurisation test was done. The nominal pressure was 3 kPa with reference to the atmospheric pressure. The results of the differential pressure of this test are shown on FIG. 4a. As it can be noticed, the mean pressure difference rose regularly. At the 8th hour, the differential pressure was reset to zero and the test was done along with the artificial leak.

By applying a correction factor from the partial pressure changes of water vapour to the differential pressure, it was possible to obtain the leak rate of FIG. 5. This leak rate, in terms of percentage of loss of volume per day, had allowed to know that the leak rate was 0.114% volume per day and that, with an appropriate calculation, the diameter of an equivalent hole was 3,50 mm (FIG. 6). The leak rate of the artificial leak as calculated with the results was 0.0483% volume per day, which is very close to the leak rate 0.0501% volume per day as calculated by using the results of the flowmeter (3.6% difference).

An extrapolation of the results is then possible in order to know what would be the leak rate at the pressure of 124 kPa, which is the highest pressure in the event of a break or an accident at Gentilly II. In Gentilly II, the maximum leak rate at that pressure is 0.5% volume per day. However, further tests have to be done to know what is the proportion of laminar flow and turbulent flow through the leaks before being able to achieve the extrapolation with confidence.

This test had shown that the method works and gives very accurate results even for a very large building, like the one tested at Gentilly II.

I claim:

1. A device to achieve the pressurisation test of a hermetical building comprising:
   (a) means to pressurize the interior air of said building to a pressurisation pressure, the air of the interior of the building having a total pressure;
   (b) an air-tight tubular network, enclosing a mass of air having a total pressure and hereinafter called "reference volume", consisting of a plurality of interconnected tubes made of a material having a good thermal conductivity, said tubular network being set inside said building and divided into sections, each section being set inside a building zone and having a given fraction of the volume of said zone in which it is located in order to reproduce the effect of said temperature variations of said zone on said total pressure in said building;
   (c) means to equalize said total pressure of said reference volume with said total pressure of said interior of said building;
   (d) means to measure over time said differential pressure between said reference volume and the interior of said building;
   (e) an air sampling network circuit set inside said building zones and sampling air of said zones proportionally to their volume with reference to the volume of the building, the sampled air consisting of a plurality of gases, each having a partial pressure;
   (f) means to measure the partial pressure of some of said gases within said sampled air in order to be able to calculate the effect of said partial pressure variations of these gases on said total pressure of the interior of said building; and
   (g) means to calculate real differential pressure variations due only to leaks of the building.

2. The device of claim 1, further comprising the following supplementary elements:
   (h) means to evaluate building integrity by calculating a diameter of a hole equivalent to said real differential pressure variations;
   (i) means to calculate a leak rate at said pressurisation pressure; and
   (j) means to extrapolate said leak rate calculated means set forth in (i), in order to evaluate the leak rate if a higher pressurisation pressure might have been used.

3. The device of claim 2, wherein said means to evaluate the integrity of said building, said means to calculate said leak rate at said pressurisation pressure and said means to extrapolate said leak rate at a higher pressure comprise a computer.

4. The device of claim 1, wherein water vapour is one of the gases that its partial pressure is to be monitored.

5. The device of claim 4, wherein said partial pressure of water vapour is measured with a hygrometer calculating the dew point of said sampled air.

6. The device of claim 5, wherein said tubes of said tubular network are preferably welded together for good air-tightness.

7. The device of claim 6, wherein said tubes are made of copper.

8. The device of claim 1, wherein said tubular network has a means to verify its air-tightness.

9. The device of claim 1, wherein said differential pressure between the exterior and the interior of said building is measured with an auxiliary differential manometer in order to apply a correction factor to correct the leak rate.

10. The device of claim 9, further comprising a barometer measuring an atmospheric pressure in order to, along with said differential pressure measured by said auxiliary differential manometer, calculate the total pressure inside said building.

11. The device of claim 1, wherein said means to measure the differential pressure between said reference volume and the interior of said building consist of a differential manometer.

12. The device of claim 1, further comprising an artificial leak having an air flow is measured by a flowmeter in order to verify the validity of said differential pressure variations as calculated.

13. The device of claim 1, wherein said means to calculate said real pressure variation comprise a computer.

14. The device of claim 1, wherein said building is a nuclear reactor.

15. The device of claim 14, wherein said test is done when said nuclear reactor is at maximum capacity.

16. Method to achieve a pressurisation test of a hermetical building, comprising the step of:
   (a) inserting a air-tight tubular network in said building, enclosing a mass of air having a total pressure and hereinafter called "reference volume", consisting of a plurality of interconnected tubes made of a material having a good thermal conductivity, said tubular network being set inside said building and divided in sections, each section being set inside a building zone and having a given fraction of the volume of said zone in which it is located in order to reproduce the effect of the temperature variations of the zone on said total pressure in said building;
   (b) installing, inside the building, an air sampling network circuit set inside said building zones and sampling air of said zones proportionally to their volume with reference to the volume of said building;
   (c) pressurizing the interior of said building with air until it reaches a desired pressurisation pressure;
   (d) equalizing the total pressure of the reference volume with said total pressure of the interior of said building;
   (e) measuring over time differential pressure variations between the interior of the building and the reference volume;
   (f) measuring partial pressure of some of the gases within the sampled air in order to be able to calculate the effect of the partial pressure variations of these gases on the total pressure of the interior of the building; and (g) calculating the real differential pressure variations due only to leaks of said building.

17. The method of claim 16, further comprising the following supplementary steps:
   (h) evaluating a building integrity by calculating a diameter of a hole equivalent to real differential pressure variations;
   (i) calculating a leak rate at the pressurisation pressure; and
   (j) extrapolating said leak rate calculated in step (i) in order to evaluate the leak rate if a higher pressurisation pressure had been used.

18. The method of claim 16, further comprising the following additional step:
   creating an artificial leak and measuring its flow in order to verify the results of said differential pressure.

19. The method of claim 16, further comprising the following additional step:
   correct the results of said leak rate in function of the pressure outside said building.

20. The method of claim 16, wherein said device is used to test the building of a nuclear reactor.

21. The method of claim 20, wherein said test is done when said nuclear reactor is at maximum capacity.

* * * * *